US007797722B2

(12) United States Patent
Lin et al.

(10) Patent No.: US 7,797,722 B2
(45) Date of Patent: Sep. 14, 2010

(54) SYSTEM AND METHOD FOR CONTENT DELIVERY

(75) Inventors: Frank Li-De Lin, Escondido, CA (US); Paul Jin Hwang, Burbank, CA (US); Masashi Kuroko, Escondido, CA (US); Timothy Scott Miller, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 345 days.

(21) Appl. No.: 11/600,579

(22) Filed: Nov. 16, 2006

(65) Prior Publication Data
US 2007/0277202 A1 Nov. 29, 2007

Related U.S. Application Data

(60) Provisional application No. 60/809,093, filed on May 26, 2006, provisional application No. 60/836,709, filed on Aug. 9, 2006.

(51) Int. Cl.
*H04N 7/173* (2006.01)
*G06F 15/16* (2006.01)
*G06F 3/00* (2006.01)
*G06F 13/00* (2006.01)
*H04N 5/445* (2006.01)
*H04N 7/10* (2006.01)
*H04N 7/025* (2006.01)
*H04H 60/33* (2008.01)

(52) U.S. Cl. ............... 725/110; 725/9; 725/34; 725/35; 725/45; 725/46; 709/218; 709/219

(58) Field of Classification Search .................. 725/46, 725/9, 34–35, 45, 110; 709/21–219; 707/9
See application file for complete search history.

(56) References Cited

U.S. PATENT DOCUMENTS

| 6,700,624 | B2 * | 3/2004 | Yun ............................ 725/40 |
| 6,948,104 | B2 | 9/2005 | Herley et al. ................. 714/712 |
| 7,490,140 | B2 * | 2/2009 | Goodman et al. ........... 709/219 |
| 2002/0010759 | A1 | 1/2002 | Hitson et al. ................ 709/219 |

(Continued)

FOREIGN PATENT DOCUMENTS

EP 1341350 A1 9/2003

(Continued)

OTHER PUBLICATIONS

Microsoft Corporation, "Background Intelligent Transfer Service in Windows Server 2003", Aug. 2002.

(Continued)

*Primary Examiner*—Christopher Kelley
*Assistant Examiner*—Randy Flynn
(74) *Attorney, Agent, or Firm*—John L. Rogitz

(57) ABSTRACT

Based on a user profile, content that is predicted to be desired by the user, including past episodes of a series that may have been missed by the user, is downloaded to the user's home system during periods of low bandwidth usage in the home system. A determination is made dynamically as to whether to provide the content from a server or a peer-to-peer network based on network attributes, file size, etc.

5 Claims, 2 Drawing Sheets

U.S. PATENT DOCUMENTS

| | | | |
|---|---|---|---|
| 2002/0049760 A1* | 4/2002 | Scott et al. | 707/10 |
| 2002/0083445 A1* | 6/2002 | Flickinger et al. | 725/42 |
| 2002/0104087 A1* | 8/2002 | Schaffer et al. | 725/46 |
| 2002/0108127 A1* | 8/2002 | Lew et al. | 725/142 |
| 2002/0138829 A1* | 9/2002 | Matsumoto et al. | 725/38 |
| 2002/0144283 A1* | 10/2002 | Headings et al. | 725/46 |
| 2002/0174430 A1* | 11/2002 | Ellis et al. | 725/46 |
| 2003/0088872 A1 | 5/2003 | Maissel et al. | 725/46 |
| 2003/0118014 A1* | 6/2003 | Iyer et al. | 370/350 |
| 2003/0126600 A1 | 7/2003 | Heuvelman | |
| 2003/0139934 A1* | 7/2003 | Mandera | 705/1 |
| 2003/0158940 A1* | 8/2003 | Leigh | 709/226 |
| 2003/0167467 A1* | 9/2003 | Allen et al. | 725/47 |
| 2003/0237097 A1* | 12/2003 | Marshall et al. | 725/105 |
| 2004/0068552 A1* | 4/2004 | Kotz et al. | 709/218 |
| 2004/0109668 A1 | 6/2004 | Stuckman | |
| 2004/0268387 A1* | 12/2004 | Wendling | 725/46 |
| 2005/0091107 A1 | 4/2005 | Blum | |
| 2005/0216473 A1* | 9/2005 | Aoyagi et al. | 707/10 |
| 2005/0216942 A1 | 9/2005 | Barton | |
| 2005/0235330 A1* | 10/2005 | O'Donnell et al. | 725/46 |
| 2006/0106807 A1 | 5/2006 | De Vitis et al. | 707/10 |
| 2006/0212542 A1* | 9/2006 | Fang et al. | 709/219 |
| 2006/0224964 A1* | 10/2006 | Schwartz et al. | 715/730 |
| 2007/0056015 A1* | 3/2007 | Kortum et al. | 725/142 |
| 2007/0183342 A1* | 8/2007 | Wong et al. | 370/352 |
| 2007/0244894 A1* | 10/2007 | St. Jacques | 707/9 |

FOREIGN PATENT DOCUMENTS

| | | |
|---|---|---|
| GB | 2367216 A | 3/2002 |

OTHER PUBLICATIONS

"Torrent Episode Downloader" Mar.

* cited by examiner

SYSTEM AND METHOD FOR CONTENT DELIVERY

This application claims priority from U.S. provisional patent application Ser. No. 60/809,093, filed May 26, 2006 and 60/836,709, filed Aug. 9, 2006, both of which are incorporated herein by reference.

FIELD OF THE INVENTION

The present invention relates generally to systems and methods for content delivery.

BACKGROUND OF THE INVENTION

Over the past few years, one of the largest evolutionary changes in the digital home environment is the Digital Video Recorder (DVR) experience. Although the basic functionality is based off of decades-old techniques (VCRs), one of the key defining features of DVRs is the ability to schedule recording based on metadata. VCR recording is limited to metadata like TIME and DATE. DVRs, with their access to greater metadata, are able to schedule recording based off of but not limited to series information.

However, as recognized herein there are limitations with these types of devices. Some examples include long waiting times between demand for the show and having the show available to watch, as well as the requirement for user interaction, in which the user must consciously decide whether to record or download a show. This leads to another limitation, namely, if the user decides mid-season that he would like to watch/record another series, typically he must wait for re-runs, to view episodes that have already aired.

Additionally, as understood herein transferring content, e.g., over the Internet, at the time of selection requires considerable time to download a media file and even more time to download multiple media files. Additionally, downloading a file at the fastest speed can saturate the users bandwidth, adversely affecting the rest of the network activities. As a consequence, web browsing is slowed, online gaming acquires jitter, etc.

Accordingly, the present invention critically recognizes that it would be desirable to provide an automated method of selecting shows. The present invention also critically recognizes that in addition or in lieu of the above it would be desirable to provide an optimized way of making the data available for viewing by both predictive transfers and trickle down bandwidth usage.

SUMMARY OF THE INVENTION

User preference information is gathered directly from the user and combined with usage information, which can be stored locally or centrally on a server outside the home. The present invention, in some aspects, automatically (without user interaction) searches the content libraries of content providers for content that, based on the combination of user defined preferences and usage history, the user is likely to have interest in. That content is loaded onto local storage without user interaction to be readily available for the user to enjoy, when the user decides to enjoy it, without delay.

Accordingly, a method for providing content over a network to a home system for display of the content on a display device of the home system includes generating a viewer profile associated with the home system, and based on the profile, predicting at least one piece of content in which a viewer of the home system is interested. The method also includes automatically pushing, not limited to but preferably during a period of low bandwidth usage in the home system, the piece to the home system over the network without a request from the home system to do so.

In non-limiting implementations the viewer profile is based on noting that an episode in a series was viewed, and the piece is an earlier episode in the series that is available on a server storing episode archives. The profile can be based on preferences received from the home system, and/or on user selection activity associated with the home system, and/or on program metadata including title, genre, and broadcast time of programs watched by a user of the home system for more than a threshold time period. A list of recommended programming can be developed based on the profile and downloaded to the home system for viewing thereof. The list may be displayed in response to manipulation of a single button on a remote controller of the home system only once.

In another aspect, a method for delivering content to a home system communicating with a server and a peer-to-peer (P2P) network includes determining a characteristic of a network associated with the home system. Based on the characteristic, it is determined whether to provide a content file to the home system from the server or the P2P network.

In non-limiting embodiments of this aspect, a number of peers in the peer network that can serve content to the home system is determined and based thereon, it is determined whether to provide the content file to the home system from the server or the P2P network. The decision of source can also be made based on file attributes.

In another aspect, a system has a home system including a display device. The system also includes a server communicating with the home system for providing content thereto for display on the display device. Logic is provided for determining content likely to be desired by a user of the home system. Also, logic provides the content to the home system during at least one period of low bandwidth usage in the home system without a request from the home system to do so.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
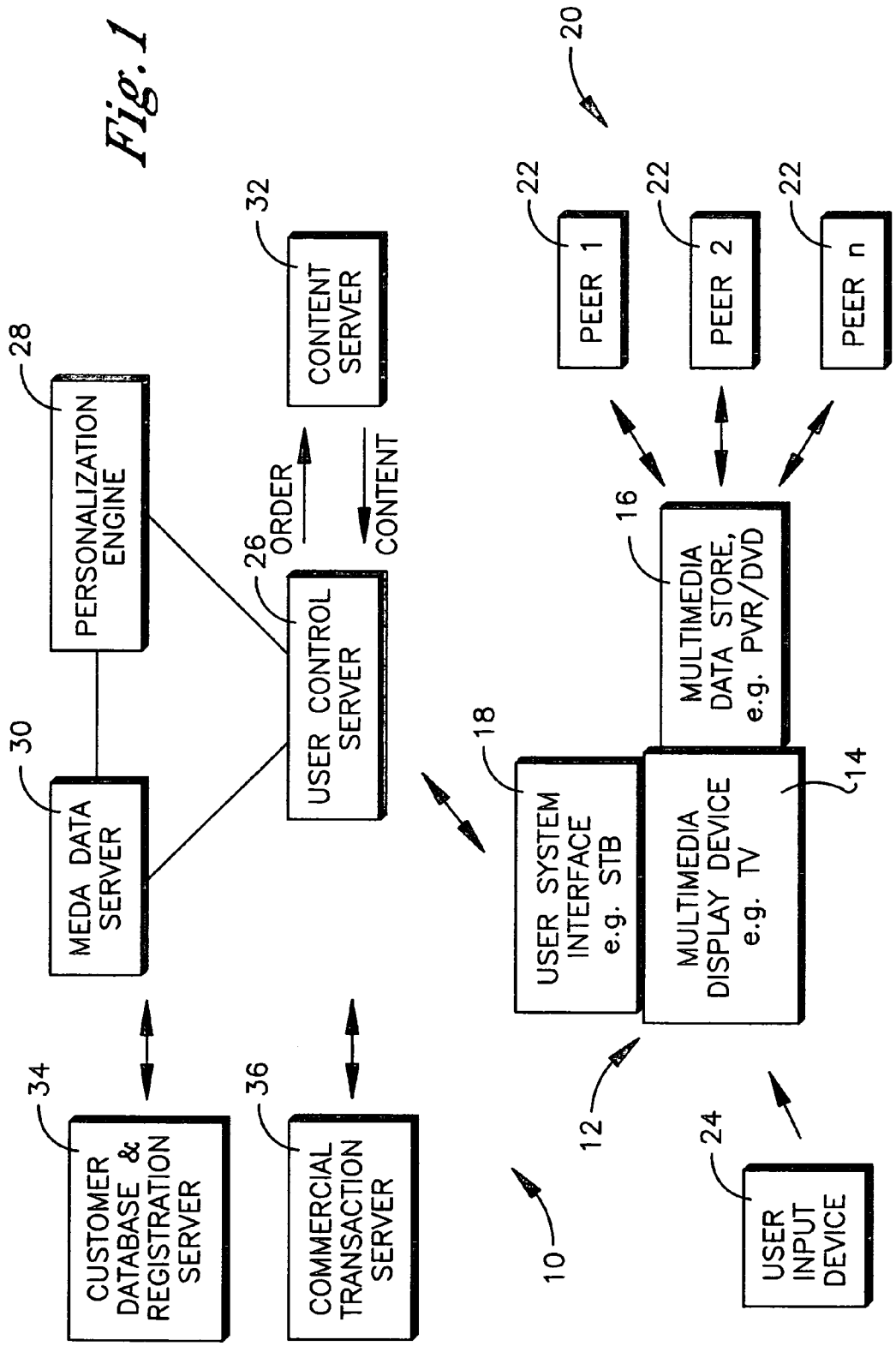
FIG. 1 is a block diagram of a non-limiting system in accordance with the present invention.

Referring initially to FIG. 1, a system is shown, generally designated 10, that is intended to provide content in an intelligent way to a user home system 12. The home system 12 may include one or more multimedia display devices 14 such as televisions and/or computers and one or more multimedia or content data stores 16 such as DVRs and disk players such as digital video disk (DVD) or Blu-Ray players, etc. that can supply content for display on the display device 14. A user system interface 18 can also be included in the home system 12 as shown for receiving content from a server as described further below or from a peer-to-peer (P2P) network 20 that includes multiple "peers" 22, i.e., multiple home systems of other users.

Without limitation, the user system interface 18 may be implemented by a set-top box. In lieu of or in addition to a STB, the user system interface 18 may also be implemented by an Internet connection device such as a wired or wireless modem or other type of wide area network connection. Thus, communication between the home system 12 and server/P2P systems described below may be via Internet and/or TV cable and/or broadcast links, both terrestrial and satellite. The home system 12 may also include one or more user input devices 24 such as keyboards, mice, TV remote controllers, etc. to receive user input as set forth further below.

As mentioned above and as shown in FIG. 1, the home system 12 can receive content from a server or server system, it being understood that the server functionality described herein may be undertaken by a single server or more servers than those shown. In the non-limiting embodiment shown, a user control server 26 functions as a gateway for server communication with the home system 12. The control server 26 communicates information from the home system 12 to a personalization engine 28, which also receives program metadata information from a metadata server 30 to develop the below-discussed user profiles. The control server 26 also communicates with one or more content servers 32 to order content (including archived TV series episodes) and receive it back in response to commands for content from the home system 12 and in response to content that the user is predicted to desire based on information from the personalization engine 28. The personalization engine 28 may reside both locally with the user or at a centrally located server.

To conclude with the non-limiting implementation shown in FIG. 1, if desired the control server 26 can also communicate with a customer database registration server 34 for storing user registration information, including demographic information, and with a commercial transaction server 36 for providing billing services based on content delivered to the home system 12.

Figure 2:
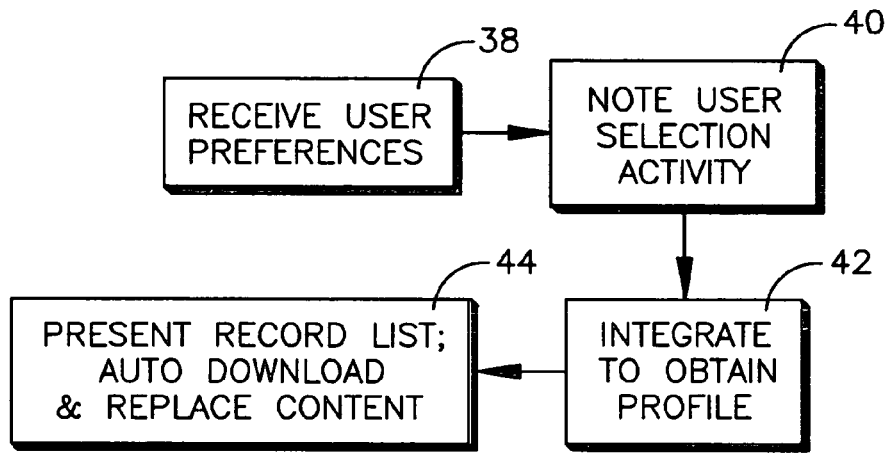
FIG. 2 is a flow chart of the content provision logic.

Referring now to FIG. 2, at block 38 user preferences are received. These preferences may include not only explicit content orders, but also generic preferences, e.g., "prefer comedies", "prefer films with Mel Gibson", etc. The preferences, which can be updated by a user of the home system 12, may be stored in the registration server 34.

In addition, at block 40 user selection activity can be noted by the control server 26 to ascertain what programs were viewed by the home system 12 and when. The viewer activity that can be monitored may also include web activity such as browsing, reading an online review, clicking on an advertising banner, etc.

Block 42 indicates that the personalization engine 28 can integrate actual user selection activity with user-input preferences to develop a profile, with a singe profile being developed for a home system 12 or with multiple profiles being developed for each user of the home system 12, in which case users might be permitted to log on to the home system 12 so that the user control server 26 is kept apprised of the identity of the individual viewing content at any particular time.

In undertaking the profile generation, program metadata such as but not limited to title, artist, genre, and broadcast time of programs watched by the user for more than a threshold time period (e.g., five minutes) can be accounted for. Also accounted for is user activity such as how often a particular show if viewed (with shows being weighted to reflect the number of times viewed) and additionally the show may be weighted even higher if it was selected for recording. In any case, the particular heuristics used by the personalization engine 28 are not limiting, and models known in the art for predicting programming that might be desired by a user whose demographics and/or preferences are known may be used.

The personalization engine 28, based on the profile, develops a list of recommended programming that can be downloaded to the home system 12 and presented on the display device 14 for viewing thereof. The input device 24 may be a remote controller, and a single button labeled, e.g., "display list" can be provided that can be toggled to cause the list to be immediately displayed on the TV in response. In such a case, the list may be downloaded and stored in the home system 12 and may be periodically updated for quick access when the button is toggled, or the list may be kept updated at the server and immediately downloaded for display when the button is toggled.

Also, based on the profile content from, e.g., the content server 32 that matches content that would be predicted to be desired from the profile may be automatically downloaded through the control server 26 to the home system 12, e.g., to the multimedia data store 16, potentially replacing least frequently viewed content thereon if storage space limitations dictate.

Preferably, in this last-mentioned step unused bandwidth on the home system 12 is used to download media via a "trickle-down" method. With more specificity, content files preferably are delivered during periods of no or low use of the network by the home system 12, so that the delivery is done in the background and has a minimal or no affect on the users internet interaction activity. User-selected media is given priority for delivery, with recommended content being delivered automatically even if not requested, storage space and bandwidth permitting.

In one exemplary non-limiting scenario, assume that the user watches and records all episodes of Show A. The profile engine shown in FIG. 1 uses this fact to determine that Shows B and C (which, e.g., may be the same genre, or have the same stars, as Show A) would be of high interest to the user, with both shows B and C being delivered to the user during time periods when the user's bandwidth is relatively free ("trickle-down delivery"). When and where appropriate, e.g., when the shows B and C (or when multiple episodes of shows B and C) have been completely delivered, the system presents a message to the user's display device indicating to the user that Shows B and C may be of interest and are available on, e.g., the user's DVR.

In another exemplary non-limiting scenario, the system notes that the user "channel" surfs, detecting when the user stops surfing to watch an entire episode of Show A. Trickle down delivery is then commenced of past episodes of Show A that may be stored on, e.g., the content server 32. At a lower priority, trickle down delivery may also be commenced of episodes of Shows B and C. In this way, past episodes are thus made available for the user to view.

Figure 3:
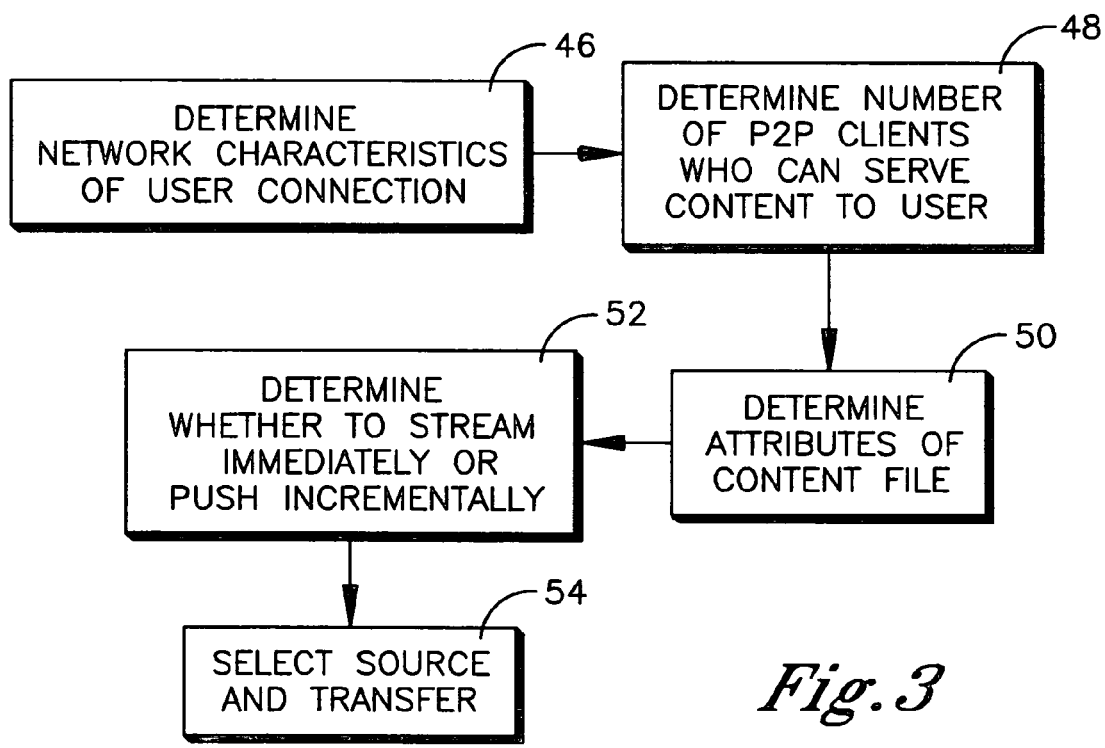
FIG. 3 is a flow chart of the logic for determining whether to send content peer-to-peer (P2P) of from a server.

FIG. 3 illustrates another advantage that may be provided by present principles, namely, optimizing the content delivery mechanism. Commencing at block 46, network characteristics are determined. These can include network characteristics of the connection from the user interface 18, including its bandwidth. At block 48, the number of peers 22 that can currently serve content is determined, and then at block 50 attributes of the file, including its size, containing the content to be provided are determined. Next, at block 52 it is determined whether content is actively being streamed to the home system 12, indicating that the demanded content is expected by the user to be watched immediately. If the home system 12 is not receiving content from external sources the above-mentioned "push" paradigm of incremental download during off-peak periods may be used. Based on these considerations, at block 54 the source (i.e., the server 26 or the P2P network 20) from which the content is to be provided is selected.

As an example, if the demanded or predicted content is in standard definition (SD) format and is not currently available via the P2P network 20, the server 26 is selected as the delivery source. On the other hand, if the content is in high definition (HD) format and is to be automatically "pushed" to the home system 12 in accordance with principles above, and there are also a number of other home networks to which this piece is designated as being pushed to or that can serve as sources for the content, the P2P network 20 can be used to deliver the content to the various home systems. More than a single peer 22 can be used, e.g., two peers 22 can negotiate among themselves such that one peer sends a first file segment while the other peer sends a second file segment, potentially simultaneously, to the home system 12.

As another example, if the number of available peers 22 is known and a piece of HD content is being transferred to the home system 12 via the P2P network 20, and during transmission a number of peers 22 serving this content are turned off, the overall throughput of the file through the P2P network 20 may be severely hampered. Accordingly, transmission of some of the file can be transferred to the server 26. Or, additional P2P peers 22 may be solicited to assist in the delivery of this piece of content. The server 26, which communicates with the peer network 20, may coordinate selection of whether it or the peer network 20 delivers the content. Also, a combination of the server 26 and peer network 20 may be used to deliver content.

While the particular SYSTEM AND METHOD FOR CONTENT DELIVERY is herein shown and described in detail, it is to be understood that the subject matter which is encompassed by the present invention is limited only by the claims.

What is claimed is:

1. A method for delivering content to a home system communicating with at least one server and at least one peer-to-peer (P2P) network, comprising:

determining at least one characteristic of at least one network associated with the home system;

based at least in part on the characteristic, determining whether to provide at least one content file to the home system from the server or the P2P network, wherein when content is delivered from the P2P network, at least first and second source peers each containing the content file negotiate with each other to determine which one of the first and second source peers sends a first segment of the file to the home system, the other one of the first and second source peers sending a second segment of the file to the home system as a result of the negotiation;

determining a number of peers in the peer network that can serve content to the home system and at least partially based thereon, determining whether to provide the content file to the home system from the server or the P2P network; and determining whether to deliver the file immediately to the home system or to incrementally deliver the file at a later time.

2. The method of claim 1, comprising determining at least one attribute of the file and at least partially based thereon, determining whether to provide the content file to the home system from the server and/or the P2P network.

3. The method of claim 1, wherein if the file is in standard definition (SD) format and is not currently available on the P2P network, the server is selected as the delivery source.

4. The method of claim 1, wherein if the file is in high definition (HD) format and is to be automatically "pushed" to the home system and a sufficient number of peers exist in the P2P network to which the file is designated as being pushed to or that can serve as sources for the file, the P2P network is selected to deliver the file.

5. The method of claim 1, wherein if the P2P network is selected and a sufficient number of peers are turned off during transmission of the file to the home network, transmission of the file is transferred to the server.

\* \* \* \* \*